[19] United States Patent
Rossi et al.

[11] Patent Number: 4,875,227
[45] Date of Patent: * Oct. 17, 1989

[54] ANTI-SCATTER GRID SYSTEM

[76] Inventors: Remo J. Rossi; John Grady, both of 300 Foster St., Litteton, Mass. 01460

[*] Notice: The portion of the term of this patent subsequent to May 9, 2006 has been disclaimed.

[21] Appl. No.: 252,380

[22] Filed: Sep. 30, 1988

Related U.S. Application Data

[63] Continuation of Ser. No. 805,870, Dec. 6, 1986.

[51] Int. Cl.⁴ ................................................ G21K 1/00
[52] U.S. Cl. ...................................... 378/154; 378/99
[58] Field of Search ................. 378/154, 155, 99, 007; 364/414; 358/111

[56] References Cited

U.S. PATENT DOCUMENTS 4,075,492  2/1978  Boyd .................................... 378/007

Primary Examiner—Craig E. Church
Attorney, Agent, or Firm—M. Lawrence Oliverio

[57] ABSTRACT

Apparatus and method for use in conjunction with an X-ray apparatus, for filtering scattered irradiation and enhancing recordation of unscattered irradiation transmitted through a subject exposed to an X-ray analysis beam. The apparatus includes a grid mechanism including filtration strips which filter scattered irradiation and obstruct unscattered irradiation from detection, a mechanism for recording an analog image of the subject from the detector, a mechanism for converting the analog image to an equivalent digital image, and a mechanism for reconstructing the image as if the unscattered irradiation absorbed by the grid were not obstructed from detection. The method comprises projecting a beam of X-ray photons at and through the subject to be examined, aligning an X-ray photon sensitive detector behind the subject with the beam of photons, filtering the scattered X-ray photons transmitted through the subject from detection with a grid of X-ray absorptive strips, recording an analog image of the subject from the detector, converting the analog image to an equivalent digital image, and reconstructing the image as if the unscattered photons are not obstructed or absorbed by the strips.

14 Claims, 2 Drawing Sheets

| T | 597 | 598 | 599 | 600 | 601 | 602 | 603 |
|---|---|---|---|---|---|---|---|
| Y | 397 | 398 | 399 | 400 | 401 | 402 | 403 |
| X |  |  |  | 200 | 201 | 202 |  |
|   |  |  |  | 300 | 301 | 302 |  |
| Z |  | 498 | 499 | 500 | 501 | 502 | 503 |
| V |  | 698 | 699 | 700 | 701 | 702 | 703 |

ANTI-SCATTER GRID SYSTEM

This application is a continuation of application Ser. No. 805,870, filed Dec. 6, 1986.

BACKGROUND OF THE INVENTION

The present invention relates to anti-scatter grid systems for use in X-ray apparati and specifically to anti-scatter grid systems for reconstructing a shadow image of X-rays projected through a subject and filtered through a grid mechanism as if the grid mechanism did not obstruct unscattered irradiation.

Despite technical promise prior grid systems have been unable to filter scattered X-ray photon irradiation from interfering with shadow image recordation and simultaneously produce clear and accurate shadow images of a subject being examined. Such prior grid systems typically employ dense arrays of X-ray absorptive strips which unduly obstruct critical unscattered image forming irradiation, cumbersome grid vibration mechanisms, and complex chamical film recording mechanisms.

It is an object of the invention, therefore, to provide an anti-scatter grid system which minimizes obstruction of unscattered irradiation.

It is a further object of the invention to provide an anti-scatter grid system which efficiently and effectively produces a clear and accurate shadow image of a subject examined with X-ray photon irradiation.

SUMMARY OF THE INVENTION

In accordance with the invention there is provided in an apparatus for projecting a beam of X-ray photons through a subject at an X-ray photon senstive detector, an anti-scatter grid system for reducing transmittance to the detector of a portion of the beam scattered by the subject and enhancing recordation of a portion of the beam passing unscattered through the subject to the detector, comprising: a grid disposed between the subject and the detector, the grid including filtration strips filtering scattered X-ray photons from detection by the detector, the strips also obstructing a minority of the unscattered X-ray photons passing through the subject from detection by the detector means; a mechanism for recording an analog image of the subject from the detector, the analog image recorded from photons absorbed by the subject and not detected by the detector, photons having passed through the subject and detected by the detector and photons having passed through the subject, obstructed by the strips and not detected by the detector;

a mechanism for converting the recorded analog image into an array of digital data representative of the analog image; and a mechanism for reconstructing the image as if the unscattered X-ray photons were not obstructed from detection by the detector.

Preferably the grid strips comprise an X-ray absorptive material, the strips being disposed in a serial spaced array relative to each other between the source and the detector. Most preferably the X-ray absorptive material is selected from the group of metals consisting of tantalum, lead, uranium, and alloys, mixtures, or laminates of at least one of said metals.

The digital data is typically stored in an addressable storage mechanism arranged in a plurality of rows and columns forming a grid array of pixels and the mechanism for reconstructing preferably comprises: a mechanism connected to the storage mechanism for retrieving data from selected pixels in the array, the selected pixels being adjacent to pixels corresponding to photon obstructed areas of the analog image; a mechanism connected to the retrieving mechanism for generating values from the retrieved data; and, a mechanism connected to the storage mechanism and the generating mechanism for storing the generated values in the pixels corresponding to the photon obstructed areas of the analog image.

The generating mechanism preferably comprises: a counting mechanism for identifying the number of retrieved data values: a summing mechanism for adding the retrieved data values; and, a dividing mechanism for dividing the output of the summing mechanism by the output of the counting mechanism. The counting mechanism preferably includes a mechanism for weighting the selected retrieved data prior to adding.

The mechanism for retrieving preferably comprises: a comparison mechanism for comparing the data stored in adjacent pixels; an identifying mechanism connected to the comparison mechanism for identifying adjacent pixels having differences greater than a selected value; and, a defining mechanism connected to the identifying mechanism for defining the photon obstructed pixels by the output of the identifying mechanism.

The number of strips per inch and the height and the thickness of the strips are preferably selected to filter a majority of the scattered photons from detection by the detector and to obstruct less than about fourteen percent of the unscattered photons from detection by the detector means.

The strips are preferably focussed at the source projecting the X-ray photon beam. The height of the strips is preferably selected to be in the range between about one quarter of an inch and about five inches, and the density of the strips is preferably selected to be in the range between about one and about ten strips per inch.

The present invention also provides a method of constructing an X-ray image of a subject which partially absorbs and partially transmits scattered and unscattered X-ray photons, comprising the steps of: projecting a beam of X-ray photons at and through the subject to be examined; aligning an X-ray photon sensitive detector behind the subject to detect the X-ray photons transmitted through the subject; filtering the scattered X-ray photons transmitted through the subject with an X-ray absorptive grid disposed between the subject and the detector, the grid obstructing a minor portion of the unscattered X-ray photons transmitted through the subject from reaching the detector; recording an analog image of the subject from the X-ray photons detected by the detector, the image representing photons absorbed by the subject, photons transmitted through the subject to the detector, and photons transmitted through the subject and obstructed from the detector; converting the analog image to a digital array of data representative of the analog image; and, reconstructing the areas of the image corresponding to the unscattered photons obstructed by the grid mechanism from the digital data.

The X-ray absorptive grid preferably comprises a serial array of spaced strips comprising an X-ray absorptive material, the strips being fixedly focussed at the source projecting the X-ray photons. The X-ray absorptive material is preferably selected from the group of metals consisting of tantalum, lead, uranium, and alloys, mixtures, or laminates of at least one of the metals.

The digital data is preferably stored in an addressable storage mechanism arranged in a plurality of rows and columns forming a grid array of pixels and the step of reconstructing preferably comprises: retrieving data from selected pixels in the array, the selected pxiels being adjacent to pixels corresponding to photon obstructed areas of the analog image; generating values from the retrieved data; and, storing the generated values in the pixels corresponding to the photon obstructed areas of the analog image.

Most preferably the step of generating comprises: counting the number of values retrieved from the selected pixels; summing the values retrieved from the selected pixels; and, dividing the summed values of thes elected pixels by the number of values retrieved. The step of counting typically comprises weighting the retrieved values of the selected pixels.

The step of retrieving typically comprises: comparing the data stored in adjacent pixels; identifying the adjacent pixels having differences greater than a selected value; and, defining the photon obstructed pixels by the output of the step of identifying.

BRIEF DESCRIPTION OF THE DRAWINGS

Other objects, features, and advantages will be apparent from the following detailed description of preferred embodiments taken in conjunction with the accompanying drawings in which.

DETAILED DESCRIPTION OF PREFERRED EMBODIMENTS

Figures 1, 3:
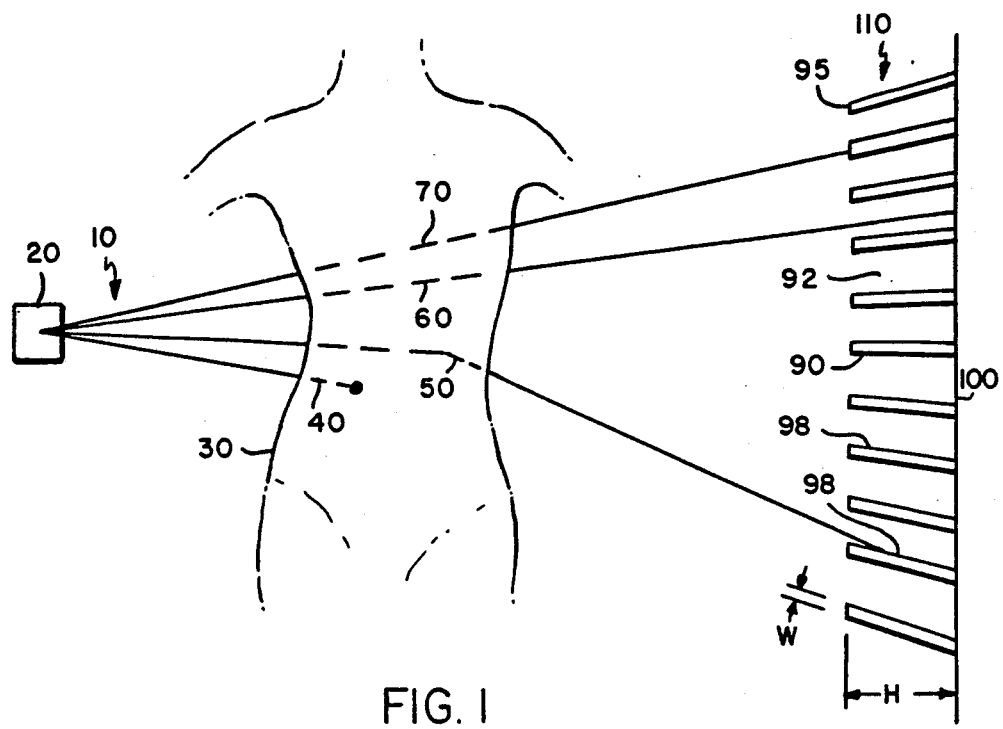
FIG. 1 is a schematic side view of a beam of X-ray photons being projected through a subject and aimed at an X-ray grid array.
FIG. 3 is a schematic two dimensional representation of a portion of a 512×512 pixel data array showing a portion of the array corresponding to a grid strip obstructed area of the detector.

With reference to FIG. 1, an X-ray apparatus provided with a conventional source 20 of X-ray photon irradiation projects a beam 10 of irradiation at a subject 10, typically a localized area of the subject 30 such as a heart, a chest, a liver or other selected body area.

The beam 10, FIG. 1, penetrates the subject 30 and individual photon beams thereof (hereinafter "photons") are either absorbed (one such absorbed photon is shown as photon 40), scattered (one such scattered photon is shown at photon 50), or unscattered (shown as photons 60, 70). An X-ray photon sensitive detector 100 is aligned with the path of the beam 10 emanating from source 20 behind the subject 30. Between the detector 100 and the subject is disposed a serial array 100 of strips 90. Each strip 90 comprises an X-ray photon absorptive material such as tantalum, lead, uranium or alloys, mixtures or laminates of one or more of all of the foregoing metals.

As shown in FIG. 1 the array 100 comprises a series of speced strips 90 each of which has a predetermined height, H, and thickness W. Spaces 92 are provided between the strips 90, the spaces 92 typically comprising a non-X-ray absorptive material such as air, aluminum, foam and the like. Such non-absorptive spaces 92 are provided so as to allow unscattered photons such as photon 60 to travel through the array 110 and be detected by detector 100. Air is most preferred as comprising the spaces 92.

Unscattered photons such as 60, 70, FIG. 1, which transmit through the subject are typically the only photons which the user wants to detect via detector 100 in order to obtain a true shadow image of the subject 30. Scattered photons such as photon 50 are typically absorbed by the array 110 of strips 90 by impinging on a face 98 of a strip 90 and thereby prevented from detection by detector 100 because such scattered photons 50 do not represent a true shadow image of the subject 30 by virtue of their scattering. Of the portion of the beam 10, FIG. 1, which ultimately transmits unscattered through the subject (generically shown as photons 60, 70), some portion of such unscattered irradiation will transmit directly through the subject 30 and the grid array 110 and ultimately be detected by detector 100 (generally represented by photon 60). However, another unscattered portion of the beam 10, as represented generically by photon 70, will transmit through the subject only to be obstructed from detection, typically by impinging on a front fact 95 of one of absorptive strips 90.

The grid array 110 of strips 90 is typically focussed at (i.e., angled as shown in FIG. 1) the source 20 from where the beam 10 or irradiation is emanating in order to avoid the incidental impingement of an unscattered photon ray, such as 60 or 70, on a face 98 of a strip 90. The object of the grid array 110, therefore, is to prevent or minimize scattered radiation such as photon 50 from being detected by detector 100 and allow as much unscattered, unabsorbed radiation 60, 70 to be detected as possible.

Therefore, although obstructed photons 70 comprise a critcal portion of the unscattered irradiation for purposes of constructing a true shadow image of the subject 30, such unscattered photons 70 are obstructed from detection in such a manner that detector 100 only detects unscattered photons 60 which transmit through subject 30 at such an angle as to pass through one of the non-absorptive spaces 92 provided between the strips 90 in array 110, FIG. 1. A small amount of scattered irradiation may reach detector 100 (now shown) by virtue of scattering through the subject at an angle which aims a scattered photon through a space 92, but the majority of scattered photons scattered toward the array 110 of strips of impinge on and be absorbed by one or more of strips 90.

The strips 92 of grid array 110 shown is schematic form in FIG. 1, are most preferably comprised of tantalum. Prior grid array systems typically employ a strip density (i.e., number of strips per inch) of greater than about 50 strips per inch and most typically about 150 strips per inch, for the purpose of preventing more than about 75% of the scattered irradiation (such as photon 50) from being detected. The concomitant disadvantage in grid systems having such a great number of strips 90 is that the total strips face area 95 per inch is concomitantly increased thereby preventing a greater amount of the critical shadow image forming radiation (such as photons 60, 70) from being detected. The present invention typically employs a strip density for grid array 110 of less than about 10 strips per inch and most preferably about two strips per inch.

Prior grid array systems typically employ a strip height, H, FIG.1, of less than about 0.25 inches. The present invention preferably employs a strip height, H, of greater than 0.25 inches, preferably between about 0.25 and five inches and most preferably about three inches. As strip height H is increased, the amount of scattered radiation (such as photon 50) which is prevented from reaching detector 100 is increased. A concomitant disadvantage in increasing strip height H is that strips 90 require more precise and selective "focusing" relative to source 20 (i.e., angle alignment of strips 90 relative to source 20) in order to avoid incidental impingement of critical image forming radiation (such as photons 60, 70) on a strip face 98. The thickness W, FIG. 1, of the strips is typically selected to be less than about ten mills and most preferably about two mils.

The result of the transmission of the unscattered photons through the subject toward the grid array 110 is that the detector 100 detects a shadow image consisting primarily of unscattered photons (such as photon 60) passing through spaces 92 on which is superimposed a serial array of dark lines corresponding to the thickness W of the strips 92 which have obstructed a portion of the unscattered photons (such as photon 70) from being detected.

According to the invention a complete shadow image of the subject is constructed from the detector 100, FIG. 1, as if the strips 90 did not obstruct any unscattered photons from detection. Such a complete image is formed by recording the photons detected by detector 100 as a conventional analog image, converting such an analog image into a digital image, i.e., a digital array of data representative of the analog image, and creating a digital image of the dark areas of the analog image. These new areas correspond to the areas of the detector obstructed by the thickness W of the strips that prevented detection of unscattered photons. Such reconstruction is accomplished via calculating a new digital array from the original digital array according to a predetermined algorithm, formula, program or function, using a conventional digital image processing device.

The detector 100, FIG. 1, typically comprises an X-ray photon sensitive material such as a gadollinium oxysulfide screen which emits fluorescent light at any given area of the screen upon impingement of photons at the given area. The degree of fluorescence over a given area of the screen will typically vary directly with the number of photons impinging on the given area of the screen. The result of projecting the beam 10 through the subject 10, therefore, is a shadow image of the photons absorbed by the subject and appearing on the screen as gradations of nonfluorescent versus fluorescent areas on the detector 100.

With reference to the schematic diagram of FIG. 1, the image 130 which fluoresces from the screen detector 100 is typically received by a mirror M and reflected as light image 140 into reception by a lens L. Lens L preferably collimates the reflected image 140 and directs such collimated image into an image intensifier II which amplifies the image and is preferably coupled to a fiber-optic bundle FOB. The light image emerging from the fiber otpic bundle FOB is received by a conventional analog image converter AC, typically a television camera. Other known devices such as large area sensitive solid state arrays and CCD's could also be used.

Figure 2:
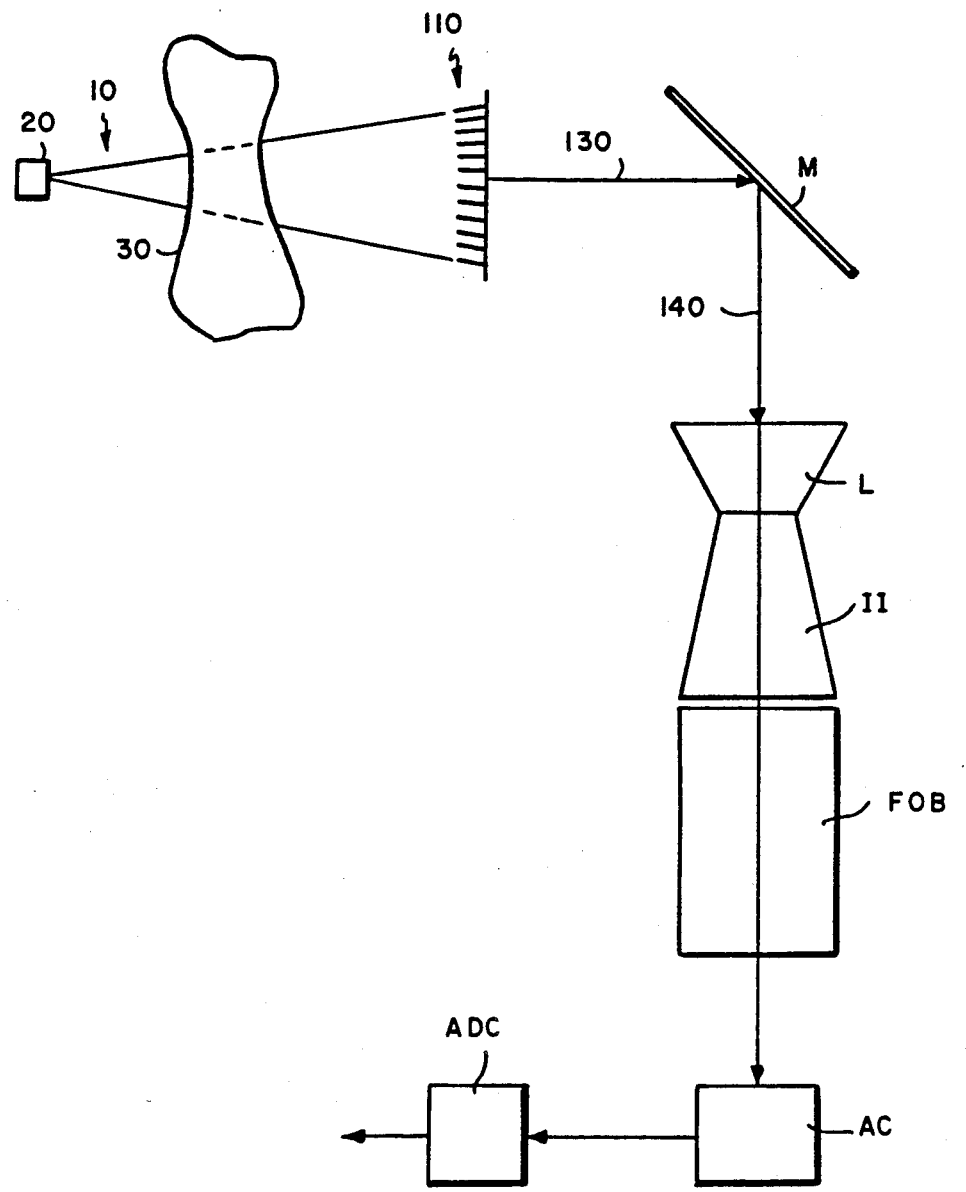
FIG. 2 is a schematic view showing the path of direction and subsequent manipulation of a light image generated from impingement of X-ray photons, having passed through a subject on an X-ray sensitive detector.

The analog image converter AC, FIG. 2, is typically electronically scanned as a series of rows, typically as a series of 512 rows, each row typically comprising 512 points. Each point within, for example, a 512 by 512 array is a pixel having an established intensity (and color, if applicable or desired). As each pixel is scanned, the output from the image converter AC, FIG. 2, is fed to an analog to digital converted ADC. The ADC provides a digital representation of the intensity of each pixel which can be stored in a digital memory. The result is a digital map of pixel intensities with a one to one correspondence to each point in the analog image. The number of rows and divisions in a single row in the array may comprise more or fewer than 512 rows and/or 512 pixels per row resulting in greater or less resolution. The art of processing images, well known per se, is outlined in *Boxe,* Digital Image Processing (Prentice Hall, Englewood Cliffs, N.J. 1984) and references cited therein.

The analog image may be recorded, and the digital data converted therefrom, in one, two, or three dimensions depending on the capability of the X-ray apparatus. Where the X-ray apparatus source, detector, and grid are rotatable in three dimensions around the subject enabling a three dimensional photon absorption image to be recorded, a suitable three dimensional digital pixel map may be constructed from the three dimensional analog image as the detector moves in three dimensions around the subject. For purposes of explanation the discussion herein is limited to two dimensional analog images and two dimensional digital arrays representative thereof.

In the exemplary case where the digital map comprises a $512 \times 512$ map, the map converted to two dimensions comprises a square, 512 pixels long and 512 pixels wide, i.e., a square map comprised of 262,144 equally sized pixels. Alternatively, the digital map may be constructed to represent the analog image in more or fewer pixels and in various grid shapes other than a square.

In a preferred embodiment of the invention where the grid system 110 has a density of about 2 strips per inch and, the strips 90 are about 2 mils in thickness W, FIG. 1, the system 110 will obstruct about 7% of the critical unscattered photons. Assuming such a grid system embodiment and assuming the length of the strips are substantially aligned with the orientation of the length of the scanned rows of pixels, each strip 90 will obstruct the equivalent of about 2 pixel rows (each 512 pixels in length) of the digital map, wherein the pixel intensities in such rows have digital contents equivalent to zero light intensity. The present invention provides a means for calculating reconstructed data for the pixels in each such digital pixel array (as if representing areas of the detector unobstructed by the thickness W of the strips 90) from the pixels bordering such obstructed pixel arrays.

Assuming the example stated above where a strip 90, FIG. 1, obstructs an array of digitally converted data, two pixels in thickness on a $512 \times 512$ map, FIG. 3 is shown as depicting, in schematic form, a portion of the exemplary $512 \times 512$ pixel map in which each square denotes a separate pixel. For example, Row X denotes a portion of a row array of data, two pixels in thickness, corresponding to an area of the detector 100 obstructed by one of strips 90, FIG. 1. Row arrays T, Y, and V, Z, FIG. 3, shown as one pixel in thickness, border row array X on the top and bottom respectively and correspond to the areas of the detector 100 detecting primarily unscattered photons immediately above and below the strip 90 which is represented by row array X.

A typical means for calculating reconstructed data for the double row X pixel 200, for example, is accomplished via a program or algorithm which selects the data from two pixels 600 and 500 bordering pixel 200 on the top and bottom, FIG. 3. The data selected from pixels 600 and 500 may be averaged and assigned to pixel 200 as reconstructed pixel data. Similarly, with respect to row X pixel 300, the data from pixels 700 and 400 may be selected, averaged and assigned as reconstructed pixel data for pixel 300. Thus two bordering pixels, each one pixel away from the row X pixel to be reconstructed (primarily because row X is two pixels in width), are typically selected to calculate the new data for a given row array X pixel. An analogous pixel selection and data averaging process is thus carried out for each pixel in each pixel row array corresponding to each strip obstructed area (now shown) of the detector and a complete reconstruction of a digital image may be effected corresponding to an analog image of the subject as if none of the unscattered photons passing through the subject were obstructed by the thicknesses W of strips 90, FIG. 1.

In such an averaging process the pixels (e.g., 500, 600, FIG. 3) adjacent the photon obstructed pixels (e.g., pixel 200, FIG. 3) are identified and counted, the data of such adjacent pixels is added, and the sum of such retrieved data is divided by the number of pixels counted. As described hereinbelow, such adjacent pixels (e.g., 500, 600, FIG. 3) are preferably identified for retrieval by comparing the data stored in all adjacent pixels in the pixel map and identifying which adjacent pixels have a difference in stored data greater than a selected or predetermined value. The adjacent pixels having such differences in data greater than the selected value may thus be defined as either a photon obstructed pixel or a non-photon obstructed pixel, i.e., the pixels on either side of the edge of a portion of the digital image corresponding to the edge of a strip 90, FIG. 1, which is obstructing unscattered photons 70 from detection.

Other programs and algorithms such as bi-directional pixel weighting or more complicated mathematical approximations may be utilized whereby different bordering pixels are selected and/or different calculations are carried out to arrive at reconstruction data for the row X strip obstructed pixels, FIG. 3.

The pixels selected and the program or algorithm selected for use in the reconstruction process will vary according to a variety of factors including the orientation of the strips 90 relative to the pixel map, the size of the pixel grid selected for mapping the analog image, the density, height, and the thickness of the strips in the grid array. The combination of all of such variables will determine the orientation, number and location of the pixels on the digital map corresponding to the various strip obstructed areas of the detector. There are many techniques of reconstructing data for the obstructed areas of a pixel map and similarly there are many programs for manipulating the pixel data collected other than averaging.

Most preferably a related handling of the pixel data in the unobstructed areas is carried out which enhances image fidelity by reducing noise and enhancing image edges and features. Multiple exposures may be made and the values of each pixel over all the exposures averaged. This technique relies upon the statistical nature of noise to add energy on one exposure and to subtract energy on the second exposure so as to average out to near zero the total noise added or substracted over many exposures. The actual signal due to the subject image will add on each exposure. This technique can be expected to increase the image signal to noise ratio by a factor equal to the square root of the number of exposures.

Another technique which may be employed is a weighted moving average. This technique improves signal to noise in real time with little time delay. This technique involves replacing the digital data of a selected pixel (to be used in reconstructing an obstructed pixel) with a weighted average of the adjacent pixels on either side of the selected pixel in question. For example, in FIG. 3 the value of pixel 600 could be calculated by the following equation:

$$v(600)^* = \frac{v(598) + 2v(599) + 5v(600) + 2v(601) + v(602)}{11}$$

Where: $v(600)^*$ is the resultant average value which replaces $v(600)$ in the pixel map, $v(598)$ is defined as the raw value of pixel 598, and $v(599)$, $v(600)$, $v(601)$, and $v(602)$ are the analogous raw values of the correspondingly numbered pixels and similarly for the other terms in the equation. The coefficients for each pixel value is an arbitrary weight given to that pixel which increases or decreases the effect of that pixel on the average value being calculated.

In this example, the value calculated at pixel 600, FIG. 3, would not be known until pixel 602 is scanned causing a two pixel delay which is neglible in most real-time applications. This technique may be broadened by including more neighboring pixels, changing the weight given to each neighboring pixel, or by including pixels in adjacent rows above and below the pixel in question but with increased time delay and data processing requirements.

In systems (such as the preferred system of the present invention) using lenses, mirrors and other typical optical devices which cause an image to be focussed onto a video camera tube, distortions occur as the tube is read out at the scene at the edge of the tube is read out. This distortion, known as parabolic distortion is corrected by analog or digital circuit techniques, the analog techniques amplify the analog video signal is a known predetermined way as the tube is scanned. This amplification compensates for the parabolic distortion. A smilar compensation can be accomplished by adding to the digital values in the pixel map so as to, in effect, amplify the signal in a manner similar to the analog circuitry.

With reference to FIG. 3, the following is a generally applicable and preferred reconstruction technique, which is useful in this invention where the grid strips 90 obstruct, for example, the rows X. The pattern of light striking rows T, Y, Z and V depends upon the shadow image of the subject. For example, if this shadow image contains a brighter to dim transition, i.e., an edge, running diagonally from the upper left to the lower right across the pixel map in FIG. 3 traversing the obstructed row X, reconstruction of that edge in the obstructed pixels of rows X may be accomplished by recognizing that a series of brighter pixels followed by a series of dimmer pixels, or vice versa, defines such an edge, and using a series of pixels prevents a single noise spike from creating a "false" edge. By logically relating bright to dim transitions on previous rows of the pixel map as the continuation of a single edge, the angle that the edge makes across the pixel map, FIG. 3, can be determined, and if a second edge and its angle is found traversing rows Z and V in FIG. 3, then these two edges can be determined to be a single edge traversing the obstructed rows X in FIG. 3 and the appropriate data inserted into the proper pixels in the obstructed rows X, thereby reconstructing the edge. Such a routine will maintain the fidelity of the image better than simple averaging.

In the typical case, the individual strips 90 of a grid array 110 are straight along their length as shown in side crosssection in FIG. 1. A grid array may also be comprised of strips which have a different geometry such as circular or the like relative to the source 20. Where the strips 90, FIG. 1, are configured to be straight, a straight row-like pattern of pixels, such as row X, FIG. 3, may be formed on the pixel grid as corresponding to the photon obstructed areas of the recorded analog image. Typically, however, the grid strips 90, FIG. 1, may be skewed or otherwise not aligned such that straight rows of pixels are obstructed.

In any grid array 110, FIG. 1 embodiment, straight, skewed, circular, or otherwise, the edge of the strips as represented by a pattern of pixels on the pixel grid may be determined by comparing the data stored in adjacent pixels to determine bright to dim transitions on the pixel map corresponding to bright to dim transitions in the recorded analog image. By identifying which adjacent pixels in the pixel map have a difference in data greater than a selected value strip edges may be defined and the pixels corresponding to the photon obstructed areas of the analog image may thus be defined as being between the defined edges.

For example, with reference to FIG. 3, if pixels 597 and 598 were bright as determined by the digital representation (i.e., the digital data collected), and pixels 599, 600, 601 and 602 were dim, an edge would be defined. Accordingly, if pixels 397, 398 and 399 were bright and 400, 401 and 402 were dim, the edge is determined to be running diagonally down from left to right from pixels 598 and 399. If the pixels 498 to 502 were bright and 503 and subsequent along each row were dim, and if 698 to 703 were bright and the subsequent pixels along such row were dim, then the edge can be logically connected from 598 and 399 to 502 and 703 and inferred to have occurred at pixels 200 and 301. Thus, the appropriate values can be reconstructed at pixels 200 and 301 preserving the fidelity of the edge through the obstructed rows. Such a technique may be expanded into more or less sophisticated techniques to reconstruct data corresponding to obstructed areas of the pixel map. Also this technique is applicable for reconstructing a shadow image edge across other patterns of obstructed pixels, which represent patterns of possible grid structures other than straight strips such as curves, circles, spheres, and essentially all other geometrical patterns.

A natural extension of the edge detection technique is to enhance that edge. Typically the transition from a series of bright pixels to dim pixels is gradual. The gradations depend upon the shadow image, how well the image is focussed and the ability of the ADC to distinguish various gray levels. However, once an edge has been logically discovered, the digital value of the pixels on the brighter side of the edge and may be increased the digital values on the dim side of the edge may be decreased by predetermined amounts to enhance the definition of the edges. A visual reconstruction of the edge from the enhanced digital values would produce a more pronounced visual edge.

Additionally, although beyond the scope of this invention, detected edges can be analyzed. The length, contour and width of the edge can be determined, if the edge outlines an object and the area of the object can be determined. Many such features of the image can be determined which lead into areas of pattern recognition.

As a general matter, the wider the digital row arrays corresponding to the strip obstructed areas of the detector become, relative to the overall size of the digital map, the more difficult it becomes to devise a predetermined pixel selection and data manipulation routine which is capable of carrying out the most accurate reconstruction of the strip obstructed pixels.

Preferably the density, thickness W, and height H of the strips 90, of the grid array 110, FIG. 1, are selected to minimize obstruction of unscattered irradiation to less than about fourteen percent of the total amount of unscattered irradiation teaching the grid array 110. Preferably the density of the strips is selected to be between about one and three strips per inch (most preferably about two strips per inch), the thickness W of the strips is less than ten mils (most preferably about four mils), and the height H of the strips is preferably greater than 0.25 inches (most preferably about three inches).

In addition to the reconstruction techniques discussed herein, the system may be first calibrated whereby pictures are taken with no subject and the system is programmed to learn where the obstructions are and thus where reconstruction is required upon actual photon irradiation of the subject. Here the edge detection scheme described earlier can be applied to find the edges of the obstructed areas in the pixel map. Additionally the analog scanner may be "wobbled" in order to fill in the obstructed areas in effect creating a controlled smearing of the collected analog image and noncomitant filling in of the obstructed area. A less preferred technique of filling in the obstructed areas involves moving or vibrating the grid array 110, FIG. 1, up and down and taking numerous pictures and collecting numerous digital data during the movement up and down to thereby obtain a time averaged reconstruction of obstructed areas in addition to the reconstruction routines discussed herein.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. In an apparatus for projecting a beam of X-ray photons through a subject at an X-ray photon sensitive detector means, an anti-scatter grid system for reducing transmittance to the detector means of a portion of the beam scattered by the subject and enhancing recordation of a portion of the beam passing unscattered through the subject to the detector means, comprising:

grid means disposed between the subject and the detector means, including filtration strips having a strip density of between one and three strips per inch and a strip height of between one and five inches for filtering scattered X-ray photons from detection by the detector means, and obstructing less than about fourteen percent of the unscattered X-ray photons passing through the subject from detection by the detector means;

means for recording an analog image of the subject from the detector means, the analog image recorded from photons having passed through the subject and the grid means and detected by the detection means;

means for converting the recorded analog image into an array of digital data representative of the analog image; and means for reconstructing the image into a complete image of unscattered photons as if unobstructed by the grid means.

2. The anti-scatter grid system of claim 1 wherein the strips comprise an X-ray absorptive material, the strips being disposed in a serial spaced array relative to each other between the source and the detector means.

3. The anti-scatter grid system of claim 2 wherein the X-ray absorptive material is selected from the group of metals consisting of tantalum, lead, uranium, and alloys, mixtures, or laminates of at least one of the metals.

4. The anti-scatter grid system of claim 1 wherein the digital data is stored in an addressable storage means arranged in a plurality of rows and columns forming a grid array of pixels, the means for reconstructing comprising:

means connected to the storage means for retrieving data from selected pixels in the array, the selected pixels being adjacent to pixels corresponding to photon obstructed areas of the analog image;

means connected to the retrieving means for generating values from the retrieved data; and means connected to the storage means and the generating means for storing the generated values in the pixels corresponding to the photon obstructed areas of the analog image.

5. The anti-scatter grid system of claim 4 wherein the generating means comprises:

counting means for identifying the number of retrieved data values;

summing means for adding the retrieved data values;

dividing means for dividing the output of the summing means by the output of the counting means.

6. The anti-scatter grid system of claim 5 wherein the counting means includes means for weighting the selected retrieved data prior to adding.

7. The anti-scatter grid system of claim 4 wherein the means for retrieving comprises:

comparison means for comparing the data stored in adjacent pixels;

identifying means connected to the comparison means for identifying adjacent pixels having differences greater than a selected value; and defining means connected to the identifying means for defining the photon obstructed pixels by the output of the identifying means.

8. A method of reconstructing a primary X-ray image of a subject which partially absorbs and partially transmits scattered and unscattered X-ray photons, comprising the steps of:

projecting a beam of X-ray photons at and through the subject to be examined;

aligning an X-ray photon sensitive detector behind the subject to detect the X-ray photons transmitted through the subject;

filtering the scattered X-ray photons transmitted through the subject with a grid means disposed between the subject and the detector, the grid means including filtration strips having a strip density of between one and three strips per inch and a strip height of between one and five inches and obstructing less than about fourteen percent of the unscattered X-ray photons transmitted through the subject from reaching the detector;

recording an analog image of the subject from the X-ray photons detected by the detector, the image recorded from photons transmitted through the subject and the grid means and to the detector;

converting the analog image to a digital array of data representative of the analog image; and reconstructing the image into a complete image of unscattered photons as if unobstructed by the grid means.

9. The method of claim 8 wherein the grid means comprises a serial array of spaced strips comprising an X-ray absorptive material, the strips being fixedly focussed at the source projecting the X-ray photons.

10. The method of claim 9 wherein the X-ray absorptive materials is selected from the group of metals consisting of tantalum, lead, uranium, and alloys, mixtures, or laminates of at least one of the metals.

11. The method of claim 8 wherein the digital data is stored in an addressable storage means arranged in a plurality of rows and columns forming a grid array of pixels, the step of reconstructing comprising:

retrieving data from selected pixels in the array, the selected pixels being adjacent to pixels corresponding to photon obstructed areas of the analog image;

generating values from the retrieved data; and storing the generated values in the pixels corresponding to the photon obstructed areas of the analog image.

12. The method of claim 11 wherein the step of generating comprises:

counting the number of values retrieved from the selected pixel;

summing the values retrieved from the selected pixels; and dividing the summed values of the selected pixels by the number of values retrieved.

13. The method of claim 12 wherein the step of counting further comprises weighting the retrieved values of the selected pixels.

14. The method of claim 13 wherein the step of retrieving comprises:

comparing the data stored in adjacent pixels;

identifying the adjacent pixels having differences greater than a selected value; and defining the photon obstructed pixels by the output of the step of identifying.

* * * * *